United States Patent [19]

Watanabe

[11] Patent Number: 4,811,810
[45] Date of Patent: Mar. 14, 1989

[54] FINAL DRIVE ASSEMBLY FOR THREE WHEELED VEHICLES

[75] Inventor: Hiromitsu Watanabe, Iwata, Japan

[73] Assignee: Yamaha Hatsudoki Kabushiki, Shizuoka, Japan

[21] Appl. No.: 544,454

[22] Filed: Oct. 21, 1983

[30] Foreign Application Priority Data

Oct. 29, 1982 [JP] Japan ................ 57-190537

[51] Int. Cl.4 ............................ B62K 13/04
[52] U.S. Cl. ................................ 180/215
[58] Field of Search ............ 180/215, 88, 75, 62, 180/226; 74/424

[56] References Cited

U.S. PATENT DOCUMENTS

| | | | |
|---|---|---|---|
| 1,879,275 | 9/1932 | Ison | 180/215 |
| 2,818,127 | 12/1957 | Mason | 180/215 |
| 3,235,021 | 2/1966 | Hill | 180/75 |
| 3,592,284 | 7/1971 | Mennesson | 180/226 |
| 4,325,449 | 4/1982 | D'Addio et al. | 180/215 |
| 4,336,859 | 6/1982 | Leitner | 180/226 |

FOREIGN PATENT DOCUMENTS 502909  5/1951  Belgium ................ 180/226

Primary Examiner—Charles A. Marmor
Assistant Examiner—Ross Weaver
Attorney, Agent, or Firm—Ernest A. Beuti

[57] ABSTRACT

Two embodiments of three wheeled shaft driven vehicles embodying an improved construction for affixing the final drive assembly to the remaining portion of the vehicle. The attachment is accomplished in a way that facilitates alignment and servicing. In each embodiment, the final drive assembly is not provided with any suspension and is affixed directly to the frame. In one embodiment, a splined connection is employed for rotatably coupling the transmission output shaft with the final drive input shaft. In the other embodiment, a universal joint is used for this purpose.

32 Claims, 7 Drawing Sheets

FINAL DRIVE ASSEMBLY FOR THREE WHEELED VEHICLES

BACKGROUND OF THE INVENTION

This invention relates to a final drive assembly for three wheeled vehicles and more particularly to an improved drive assembly that permits easy alignment of the driving components upon assembly.

The use of three wheeled vehicles for a wide variety of off the road use has recently gained large acceptance. Such vehicles normally employ large low pressure tires which obviate the necessity for separate suspension systems. However, in view of the fact that no suspension system may be incorporated in such vehicles, particularly at the rear wheel, certain problems arise. In order to minimize wear, noise and vibrations, it is extremely important that the rear axle be accurately aligned. These problems are particular actute when the vehicle employs a shaft drive since the drive shaft must be capable of accurate alignment in order to avoid the aforenoted problems. In addition, the construction should be such as to permit ease of disassembly and reassembly for servicing. Ease of alignment during such reassembly is, of course, of great importance.

It is, therefore, a principal object of this invention to provide an improved final drive assembly for three wheeled vehicles.

It is another object of the invention to provide a drive assembly for non-suspended axles that facilitates alignment.

It is yet a further object of this invention to provide a final drive assembly for vehicles having shaft drives that facilitates assembly and alignment.

SUMMARY OF THE INVENTION

This invention is adapted to be embodied in a final drive arrangement for a three wheeled vehicle or the like comprising frame means, at least one front wheel dirigibly supported by the frame means, a power plant supported by the frame means and having an output element extending in a generally longitudinal direction at one side of the frame means and a final drive assembly. The final drive assembly comprises a housing assembly, a rear axle assembly journaled by the housing assembly, a pair of rear wheels affixed to opposite ends of the rear axle assembly and a final drive for driving the rear axle assembly comprising an input element extending in a generally longitudinal direction and positioned at one side of the final drive assembly and in alignment with the power plant output element. In accordance with the invention, coupling means are provided for drivingly coupling the input element with the output element for driving the rear axle assembly from the power plant. Means carried by the housing assembly are incorporated for detachably affixing the housing assembly rigidly to the frame means with the coupling means in engagement.

DETAILED DESCRIPTION OF THE PREFERRED EMBODIMENTS

Figure 1:
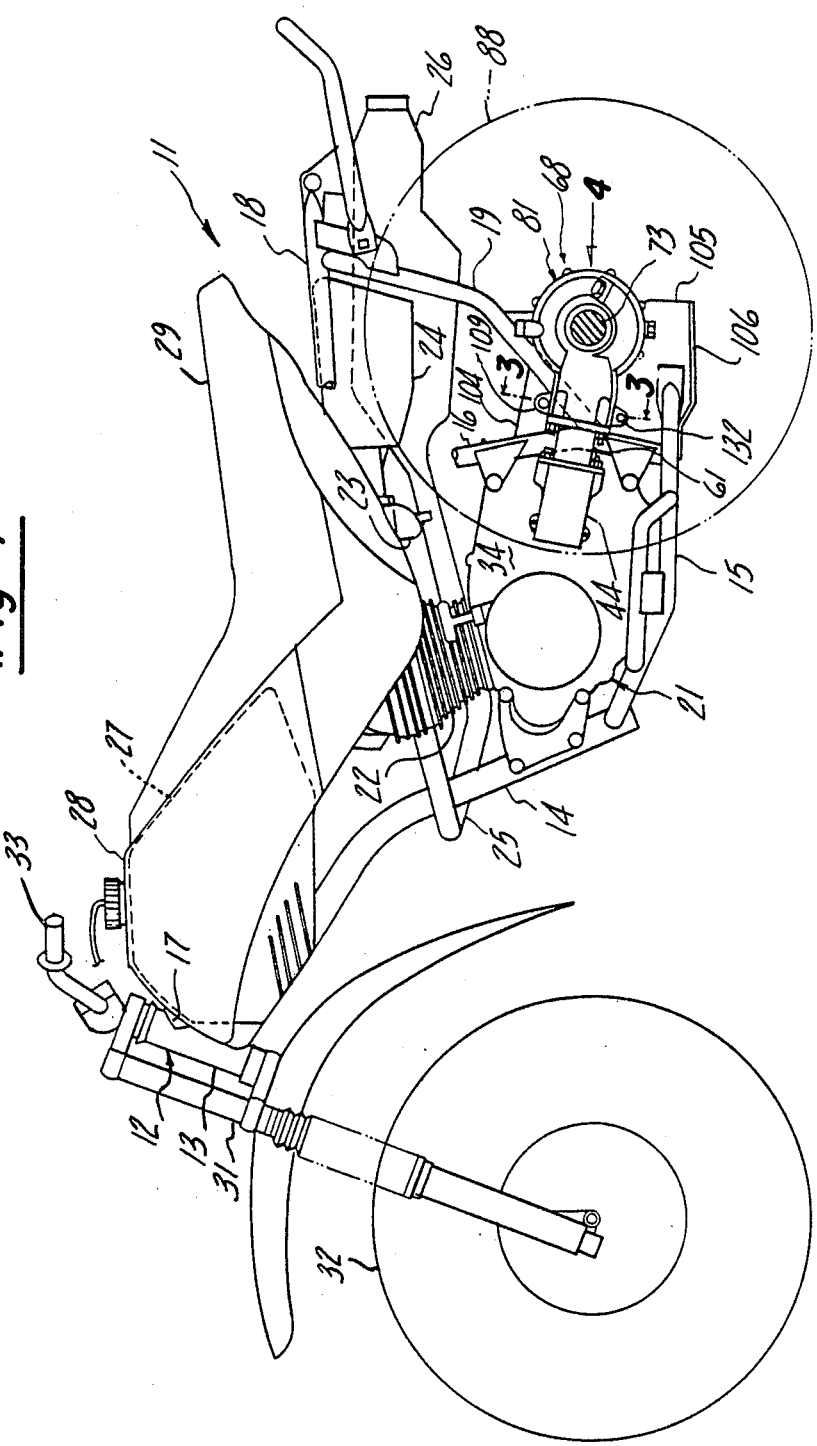
FIG. 1 is a side elevational view of a three wheeled vehicle constructed in accordance with a first embodiment of the invention, with the rear wheels shown in phantom and the rear axle shown in cross-section.
Figure 2:
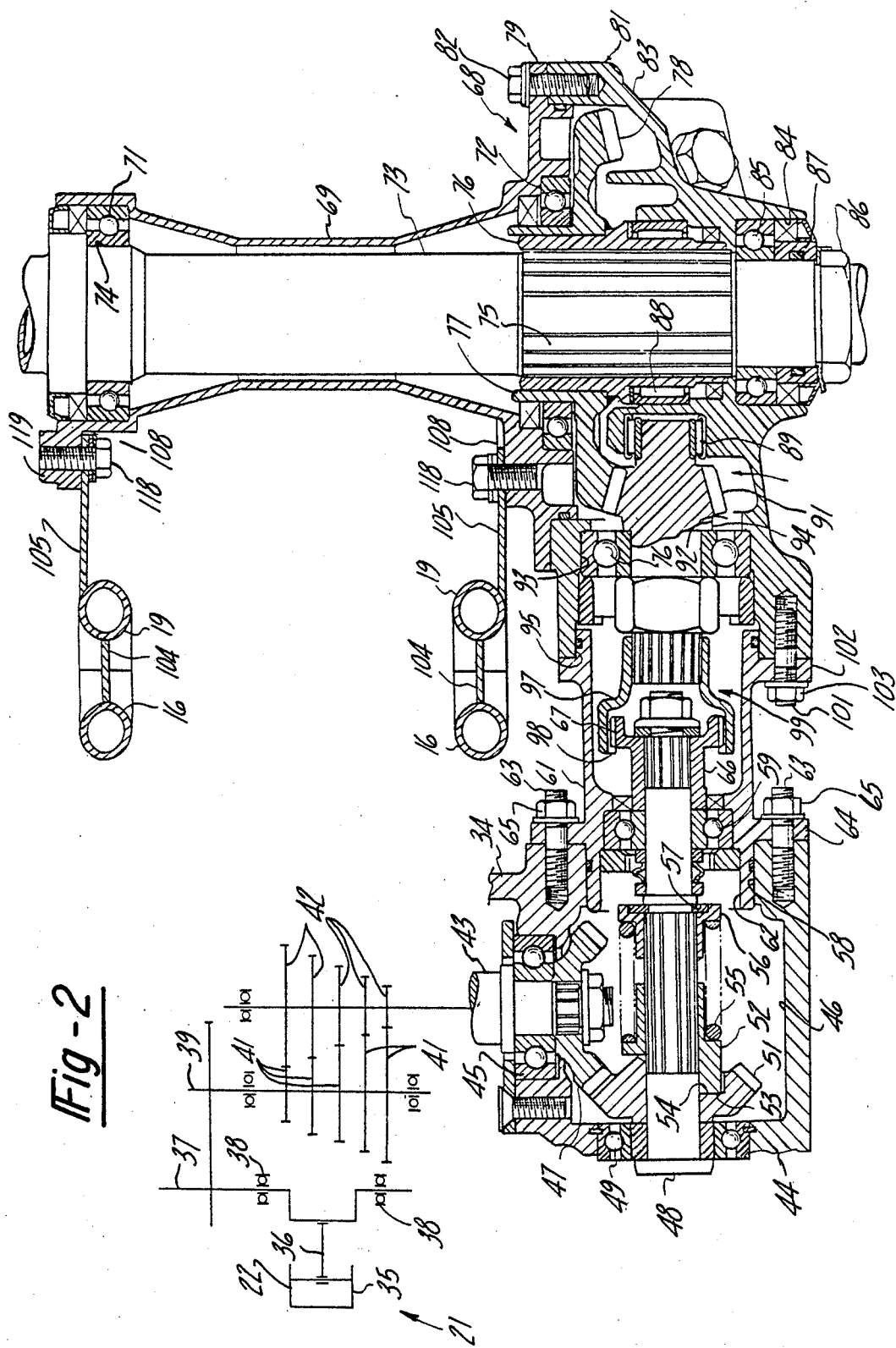
FIG. 2 is an enlarged, cross-sectional view showing the final drive assembly of the vehicle and the engine and transmission assembly in a generally schematic fashion.
Figure 3:
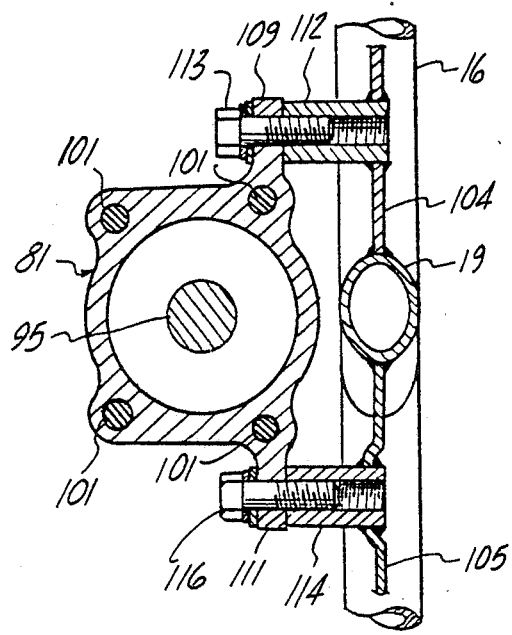
FIG. 3 is an enlarged, cross-sectional view taken along the line 3—3 of FIG. 1.

Referring first to the embodiment of FIGS. 1 through 5, an off the road three wheeled vehicle constructed in accordance with this embodiment is identified generally by the reference numeral 11. The vehicle 11 includes a frame assembly, indicated generally by the reference numeral 12, which includes a head tube 13. A single down tube 14 extends from the head tube 13 and terminates at the lower end of the vehicle 11. A pair of horizontally extending lower frame tubes 15 extend rarewardly from opposite sides of the lower end of the down tube 14 to provide a frame assembly which has a generally Y shape in top plan. Seat pillar rails 16 extend upwardly from the horizontal tubes 15 at the rear ends of the horizontal tubes 15. The upper ends of the seat pillar tubes are connected to a main frame tube, which appears only partially in FIG. 1 and which is identified by the reference numeral 17. The forward end of the main tube 17 is connected to the head tube 13 in a known manner.

A pair of seat rails 18 extend rearwardly from the seat pillar tubes 16 and are supported at their rear ends by back stays 19 that extend from the seat pillar tubes 16, adjacent the horizontal tubes 15.

A power plant, indicated generally by the reference numeral 21, is supported within the frame assembly 12 in a known manner and specifically by means of brackets attached to the down tube 14 and to the seat pillar rails 16. The power plant 21 includes an internal combustion engine of any suitable type 22. In the illustrated embodiment, the engine 22 is of the single cylinder, air cooled type and is provided with an induction system including a carburetor 23 and combined air cleaner silencer assembly 24 that is disposed at one side of the frame assembly 12. The carburetor 23 delivers a combustible fuel/air mixture to the cylinder of the engine 11 in a known manner. Exhaust gases are discharged from the engine 22 through an exhaust pipe 25 that extends forwardly, around the down tube 14 and then rearwardly where it terminates at a muffler tailpipe assembly 26 that is disposed on the side of the frame assembly 12 opposite to the air cleaner 24.

A fuel tank 27 is supported by the frame assembly 12 and supplies fuel in a known manner to the carburetor 23. The fuel tank 27 is enclosed by means of a body assembly 28 that is formed with a seat portion 29 to accommodate a rider and, if desired, a passenger.

The head tube 13 journals a fork assembly 31 which, in turn, rotatably supports a wheel on which a balloon type low pressure tire 32 is mounted. The fork assembly 31 and wheel 32 are dirigible and may be steered by means of a handlebar assembly 33 that is affixed to the upper end of the fork assembly 31.

The power plant 21, in addition to including the engine 22, includes a change speed transmission and clutch assembly that is contained within a casing 34, which may also function as the crankcase for the engine 22. This assembly may be best understood by reference to FIG. 2, wherein the engine 22 and transmission is shown in a partially schematic fashion.

As has been noted, the engine 22 is of the single cylinder type and includes a piston 35 that is connected by means of a connecting rod 36 to a crankshaft 37 that is journaled in a pair of spaced bearings 38 supported in a suitable manner by the housing 34. The crankshaft 37 drives a transmission primary shaft 39 in a suitable manner through transfer gears and a clutch assembly (not shown). A plurality of gears 41 of different sizes and having different numbers of teeth are affixed to the primary transmission shaft 39 and are in mesh with output gears 42. The output gears 42 are journaled on an output shaft 43 and may be rotatably coupled to the shaft 43 through suitable synchronizing and/or clutching elements. The internal construction of the transmission may be considered to be convention and, for that reason, has not been illustrated or described in any great detail.

The casing 34 has a generally cylindrical side portion 44 which may be made either integral with the casing 34 or which may be a separate piece that is affixed to it. The output end of the transmission secondary shaft 43 is journaled in the portion 44 by means of a bearing 45 and extends into an opening 46 formed by the portion 44. A bevel gear 47 is non-rotatably affixed to the portion of the transmission secondary shaft 43 that extends into the cavity 46. A power plant output shaft 48 is journaled at its forward end in the casing portion 44 by means of an anti-friction bearing assembly 49 and is disposed with its rotational axis extending generally longitudinally of the frame assembly 12 at one side of the frame assembly. A bevel gear 51 is journaled at the forward end of the power plant output shaft 48.

The bevel gear 51 is rotatably coupled to the output shaft 48 by means of an overload release device that includes a sleeve 52 that has a splined connection to a centrally splined portion of the output shaft 48. The internally splined sleeve 52 has forwardly extending projections 53 that are received in recesses 54 formed at the inner face of the bevel gear 51 so as to rotatably couple the bevel gear 51 to the output shaft 48.

A coil compression spring 55 is engaged at one end with the sleeve 52 and at its opposite end with a flange 56 of a sleeve like member that is axially affixed to the output shaft 48 by means of a snap ring 57. The coil spring 55 normally urges the projections 53 into the recesses 54 so as to rotatably couple the bevel gear 51 with the output shaft 48. If the final drive (to be described) strikes an obstacle and there is sufficient resistance to its rotation, the projections 53 will be cammed out of the recesses 54 to compress the spring 55 and uncouple the gear 51 from the output shaft 48 so as to prevent any damage.

The rear end of the output shaft 48 extends through a cylindrical opening 58 that is formed at the rear end of the casing portion 44. This portion of the output shaft 48 is journaled by means of an anti-friction bearing 59 that is received in a counterbored portion of a tubular housing 61. The tubular housing 61 has a pilot portion 62 that is received within the housing opening 58 so as to align the tubular housing 61 with the casing portion 44.

The housing portion 44 is provided with a plurality of tapped holes around the opening 58 in which studs 63 are threaded. The tubular housing 61 has an annular flange 64 adjacent its pilot portion 62 that is formed with openings that pass the studs 63. Nuts 65 are affixed to the studs 63 so as to affix the housings 61 and 34 to each other.

The portion of the output shaft 48 that extends into the hollow interior of the tubular housing 61 is externally splined. Internal splines of a coupling member 66 rotatably affix the coupling member 66 to this portion of the output shaft 48. The coupling member 66 also has an externally splined portion 67 for connection to the final drive assembly, in a manner to be described.

The final drive assembly is shown in each of FIGS. 1 through 5 and is identified generally by the reference numeral 68. The final drive assembly 68 includes an axle housing assembly 69 that supports anti-friction bearings 71 and 72 at its opposite ends in respective counterbored openings. A rear axle 73 extends through the axle housing 69 and is journaled directly at one end by the bearing 71 through a cylindrical enlarged diameter portion 74 of the shaft 73. The opposite end of the axle shaft 73 adjacent the bearing 72 is formed with external splines 75 onto which an internally splined sleeve 76 is affixed. The sleeve 76 is, in turn, affixed to a cylindrical portion 77 of a ring gear 78 which is, in turn, journaled in the bearing 72.

The end of the axle housing 69 adjacent the ring gear 78 is formed with an outwardly extending flange 79. A combined cover plate, final drive housing, indicated generally by the reference numeral 81, is affixed to the flange 79 by means of a plurality of bolts 82. The final drive housing 81 has a portion 83 that extends outwardly and which defines a counterbore 84 in which a further bearing 85 is positioned. The bearing 85 supports the outboard end of the axle shaft 73. It should be readily apparent from viewing FIG. 2 that the axle shaft 73 is installed into the assembly by inserting it through the bearing 71 first and then through the bearing 85. The axle shaft 73 is affixed in its axial location by means of a nut 86 that is received on a threaded portion of the axle shaft 73 and which engages a spacer 87 so as to axially position the shaft 73.

The housing portion 83 also supports a further anti-friction bearing 88 which journals the bushing 76. Thus, the axle assembly is well supported by a plurality of bearings so as to take all of the load and these bearings are spaced at a substantially distance from each other so as to improve the stability of the vehicle.

Figure 4:
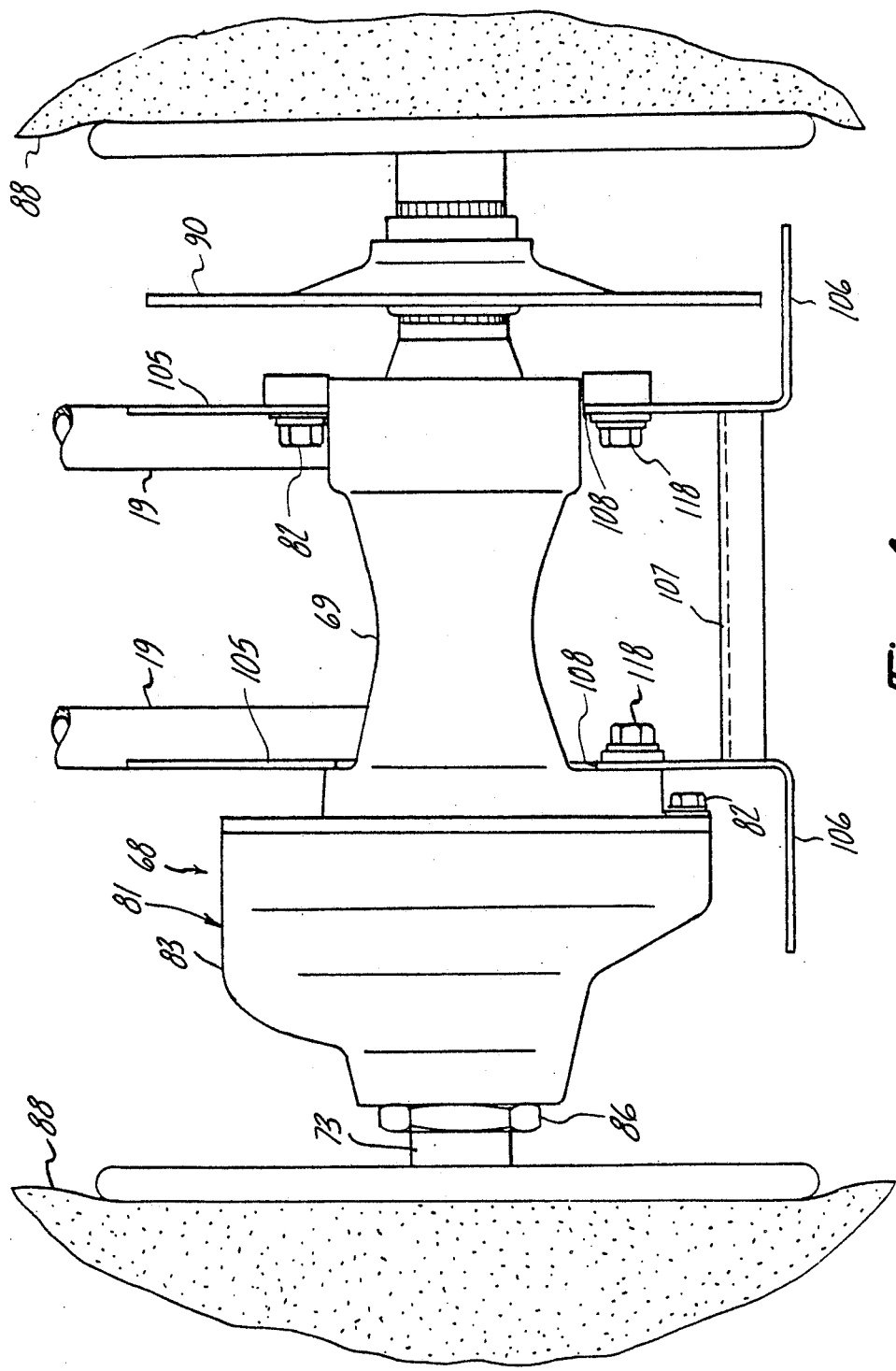
FIG. 4 is an enlarged, rear elevational view looking in the direction of the arrow 4 in FIG. 1.

A pair of wheels carrying balloon low pressure tires 88 are affixed in a known manner to the outer ends of the axle shaft 73 (Figure 4). In addition, a rotor 90 of a disc brake assembly (not shown) may be affixed by a splined connection to the side of the axle shaft 83 on the opposite to that of the final drive housing 81.

The forward portion of the final drive housing 81 carries an anti-friction bearing 89 that journals the rear end of a pinion gear 91. The pinion gear 91 is in mesh with the ring gear 78 and is supported at its opposite side by means of a further anti-friction bearing 92 that is received in a counterbore 93 at the forward end of the housing 81. The pinion gear 91 has a shaft portion 94 that is journaled in the bearing 92 and which extends forwardly through a cylindrical opening 96 at the forward end of the final drive housing 81. A coupling member 97 has an internally splined portion that is received on a splined portion of the pinion gear shaft 94 so as to rotatably couple the coupling member 97 to the pinion gear shaft 94. The coupling member 97 has an internally splined portion 98 that is in engagement with the splines 67 of the coupling member 66. Hence, the coupling members 66 and 97 form a splined coupling, indicated generally by the reference numeral 99 that serves to rotatably couple the transmission output shaft 48 with the pinion gear shaft 94.

The forward portion of the final drive housing 81 is formed with a plurality of tapped openings in which studs 101 are received. The tubular housing 61 has an outwardly extending flange 102 at its rear end that is provided with openings to pass the studs 101. Nuts 103 are threaded onto the studs 101 so as to affix the tubular housing 61 to the final drive housing 81 in accurate alignment. The tubular housing 61 has a pilot portion that extends into the opening 96 so as to assist in this alignment.

It should be readily apparent that it is extremely important that the alignment between the output shaft 48 of the power plant 21 and the pinion shaft 94 of the final drive assembly 68 be accurately located. This will assure accurate location of the axle shaft 73 and prevent misalignments which would cause wear, noise and unbalance. The final drive assembly is fastened together and is affixed rigidly to the frame 12 in such a manner as to insure this good alignment. This method of assembly and construction which permits it will now be described.

The construction of the frame assembly 12 is such so as to assist the location and mounting of the final drive 68 to the remainder of the vehicle 11. For this purpose, a gusset plate 104 is affixed at the bight of the frame tubes 16 and 17 on each side of the frame assembly 12 so as to offer reinforcing in this area and also so as to afford a means of attachment, as will be described. In addition to the gusset plate 104, a further plate 105 is affixed to the rear end of each of the tubes 19, 16 and 15 at their lower ends. The plate 105 at each side of the frame 12 extends rearwardly and has an outwardly extending flange 106 formed at its lower end, which flange serves the combined function of adding stiffening and also for protecting some of the components of the final drive assembly 68.

A further plate 107 extends between the inner sides of the plates 105 and is affixed, as by welding, to them so as to provide a box like closed construction at the rear lower end of the frame assembly 12 so as to add further stiffness in this area to support the final drive 68.

The plates 105 are each formed with arcuate shaped cutouts 108 in their rear face which are sized so as to afford clearance around the axle housing 69.

The forward portion of the final drive housing 81 is formed with an upwardly extending lug 109 and a downwardly extending lug 111. Bored openings are formed in the lugs 109 and 111. Upon assembly of the final drive 68 to the frame, the bore in the lug 109 will be aligned with a tapped opening formed in a bushing 112 that is affixed to the plate 104 and which extends transversally outwardly from it. A bolt 113 is received in this tapped opening so as to affix the lug 109 to the frame.

In a like manner, the bore in the lug 111 is adapted to be aligned with a tapped opening in a bushing 114 that is affixed to the forward end of the plate 105 and which extends outwardly from it. A bolt 116 is adapted to be received in this tapped opening so as to affix the lug 111 to the plate 105 and, accordingly, to the frame 12.

The plates 105 each have a pair of rearwardly disposed holes 117 that are adapted to receive bolts 118 that are threaded into the flange 79 of the housing 69 and a flange 119 formed on the opposite end of the axle housing 69. In this way, the final drive assembly 68 is rigidly attached to the frame and is positively located so as to insure good alignment and high strength.

Figure 5:
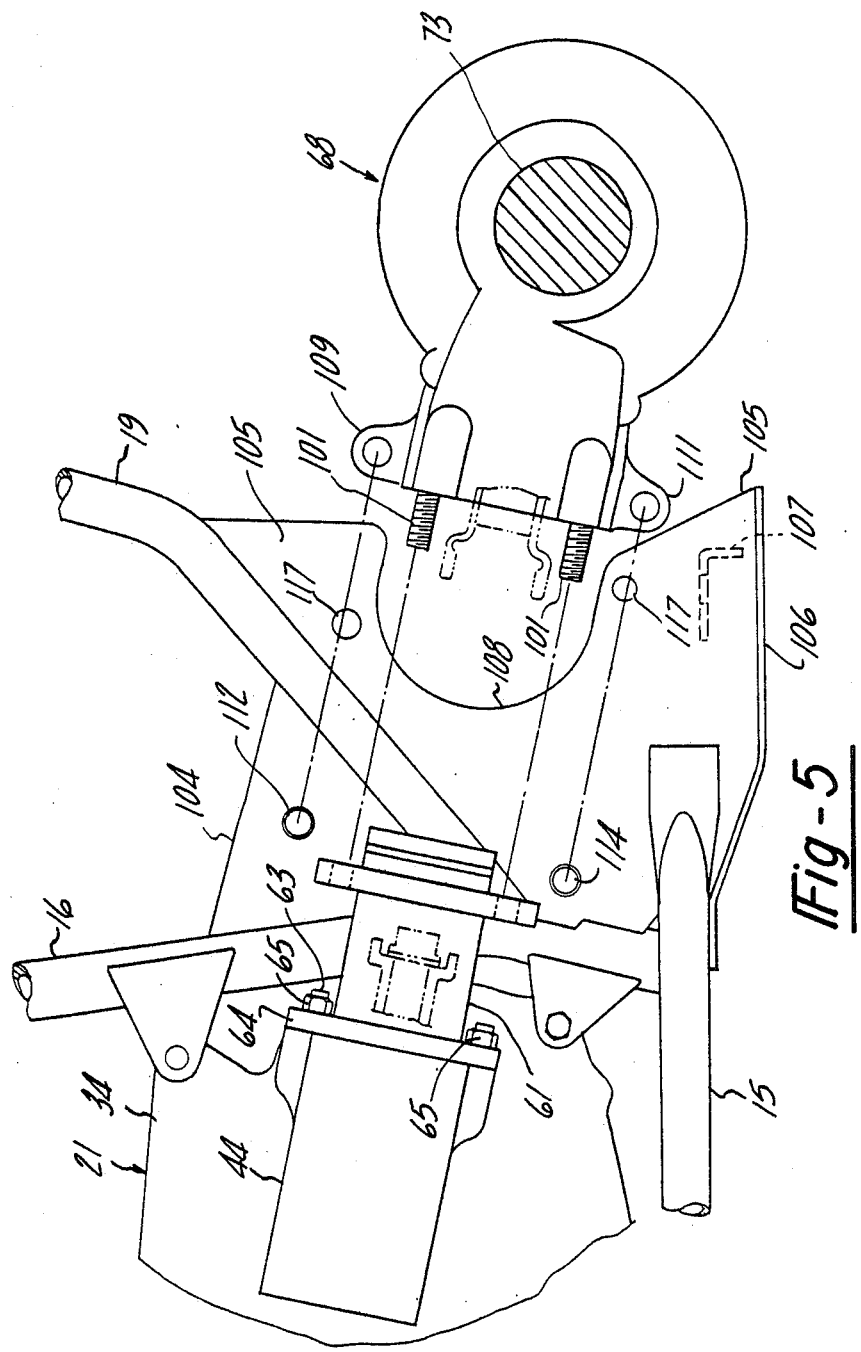
FIG. 5 is an enlarged, side elevational view showing the manner of assembly of the final drive to the remainder of the vehicle.

FIG. 5 shows, in somewhat exploded view, how the assembly takes place. In this figure, the final drive assembly 68 is withdrawn rearwardly so that the coupling members of the coupling 99 will be disengaged. The final drive assembly 48 is moved in a generally longitudinal direction and axially relative to the drive shaft 68 so that the housing flanges 79 and 119 of the axle housing 69 will move into the plate recesses 108. The studs 101 will pass through the apertures in the tubular housing flange 102 and the splined connection 99 will move into engagement. The lugs 109 and 111 are then aligned with the bushings 112 and 114 and the openings 117 are aligned with the tapped openings in the axle housing flanges 79 and 119 so that the bolts 113, 116 and 118 may be used to affix the assembly together. Disassembly is accomplished in the reverse orientation so that the unit and specifically the entire final drive 68 may be removed for servicing in a convenient and highly simple manner.

Figure 6:
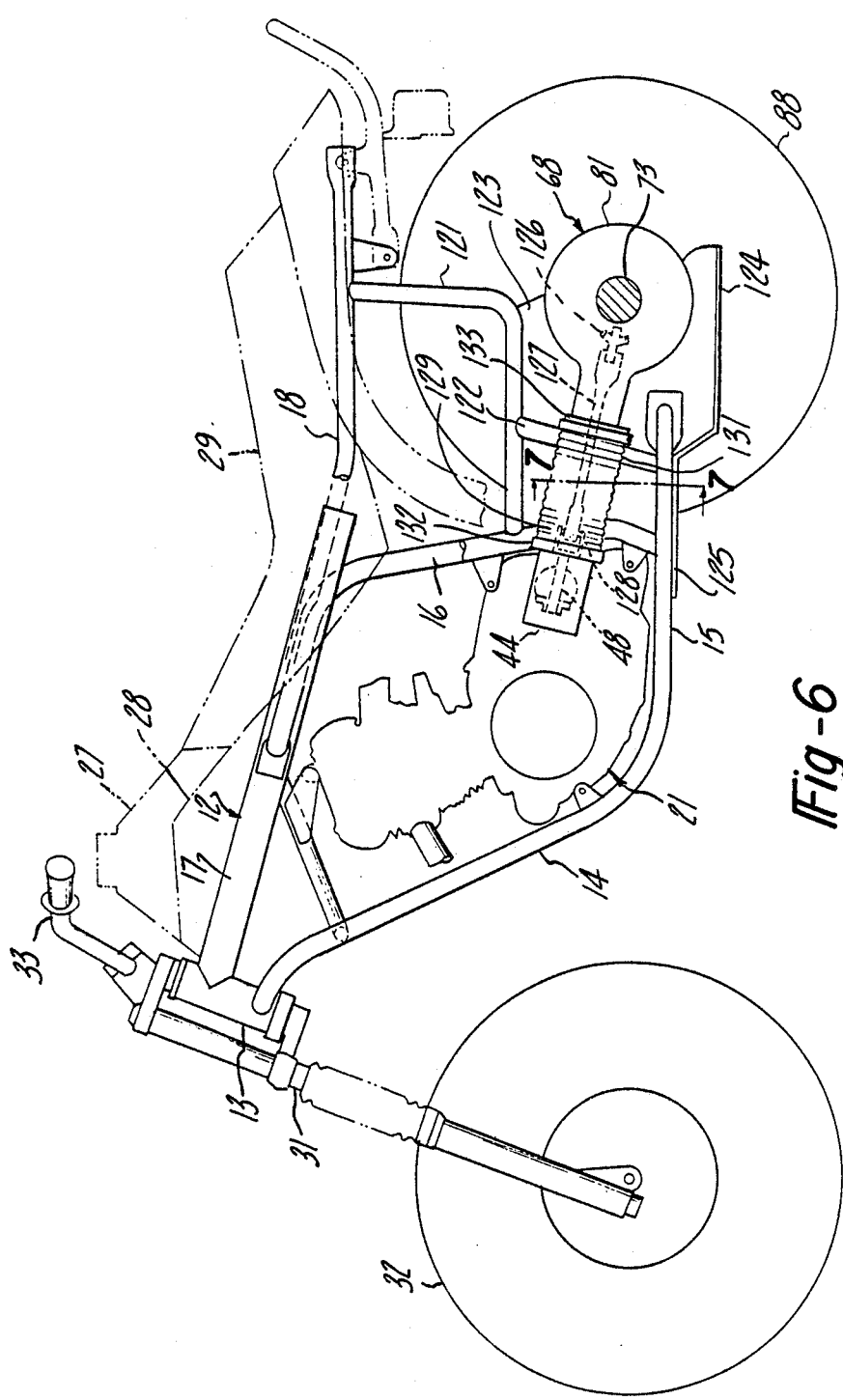
FIG. 6 is a side elevational view of a vehicle constructed in accordance with another embodiment of the invention, with portions shown in phantom and other portions shown in section.
Figure 7:
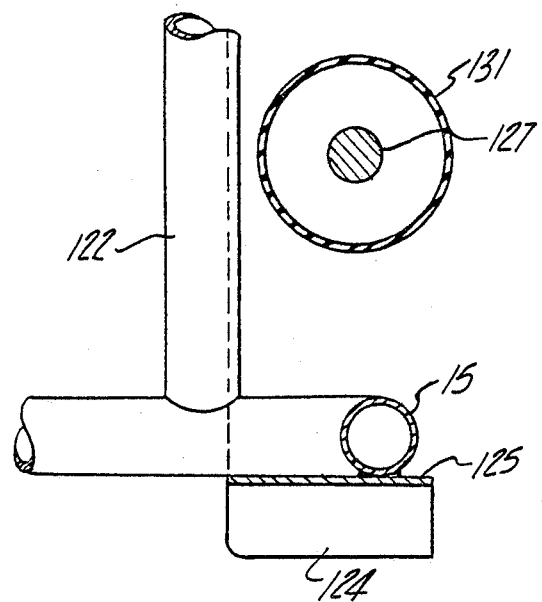
FIG. 7 is an enlarged, cross-sectional view taken along the line 7—7 in FIG. 6.

Another embodiment of the invention is shown in FIGS. 6 and 7. In this embodiment, the major components are the same as in the embodiment of FIGS. 1 through 5 and, for that reason, such similar components have been identified by the same reference numeral and will not be described again in great detail. In the previously described embodiment, the final drive housing was rigidly affixed to the tubular member that extended from and was affixed to the transmission assembly and which contained the output shaft. Furthermore, there was a splined coupling between the input shaft of the final drive assembly and the output shaft of the power plant. A slightly different arrangement is used in this embodiment and only that portion of the construction will be described in detail by particular reference to FIGS. 6 and 7.

In this embodiment, the frame assembly 12 is slightly different from the frame assembly of the embodiment of FIGS. 1 through 5. In this embodiment, a pair of generally L-shaped back stay frame tubes 121 are affixed to the seat rails 18 and seat pillar rails 16 at each side. A pair of generally vertically extending frame tubes 122 are affixed at their upper ends to the horizontal leg of the frame tubes 121 and at their lower ends to the horizontal tube 15. The horizontal tubes are also integrally formed at the lower ends of a pair of down tubes that are affixed at their upper ends to opposite sides of the head tube 13. As a result of this construction, the frame assembly has a generally box shape at each of its lower rearward ends which adds further to the rigidity.

As with the previously described embodiment, a plate 123 is affixed to the lower end of the frame assembly and extends rearwardly. In this embodiment, each plate 123 is affixed to the frame tube 15, 122 and 121 and also has an arcuate recess in its rearward end so as to receive and clear the final drive assembly 68. The plates 123 further have outwardly extending flanges 124 that add to their rigidity. In this embodiment, each flange 124 has a forwardly extending portion 125 that is affixed to the underside of the frame tube 15 at the respective side.

If desired, the plates 124 at each side may be affixed to each other as in the previously described embodiment.

In this embodiment, the final drive assembly 68 is supported solely by the plates 123 and this support may be achieved by means of a construction as of the type previously described.

In this embodiment, the final drive 68 has a pinion gear 126 that is in mesh with a ring gear (not shown) as with the previously described embodiment. However, the pinion gear 126 is non-rotatably coupled to an elongated drive shaft 127 that extends forwardly beyond the forward end of the final drive housing 81 and which terminates adjacent the rear end of the transmission casing portion 44. The transmission output shaft 48 has at its rear end a yoke 128 of a universal joint assembly, indicated at 129. A corresponding yoke is affixed to the forward end of the drive shaft 127 so as to couple the drive shaft to the transmission output shaft 48.

A flexible elastomeric boot 131 extends around the drive shaft 127 and universal joint 129 and has its forward end affixed to a flange 132 formed around the transmission casing 44 and its rearward end extending around and affixed to a flange 133 of the final drive housing 81. The boot 131 may be affixed to the flanges 132 and 133 in a known manner as by means of flexible clamps. This embodiment may be assembled by removing one of these clamps and sliding the boot 131 rearwardly sufficiently so as to afford access to the universal joint 129 and to couple the shaft 48 and 127 together. In other regards, this embodiment is the same as the embodiment of FIGS. 1 through 5.

It should be readily apparent from the foregoing description that a relatively simple and highly effective final drive assembly is provided that facilitates assembly and disassembly, insures good alignment and which may be easily serviced. Although two embodiments of the invention have been illustrated and described, various changes may be made without departing from the spirit and scope of the invention, as defined by the appended claims.

I claim:

1. In a final drive arrangement for a wheeled vehicle comprising frame means, a single seat carried by said frame means, at least one front wheel carrying a balloon tire dirigibly supported by said frame means, a power plant supported by said frame means and having an output element journaled for rotation about an axis extending in a generally longitudinal direction by said frame means and fixed axially thereto, and a final drive assembly comprising a housing assembly, a rear axle assembly journaled in said housing assembly, a pair of rear wheels carrying balloon tires affixed to opposite sides of said rear axle assembly, and a final drive for driving said rear axle assembly comprising an input element journaled by said housing assembly about an axis extending in a generally longitudinal direction and positioned at one side of said final drive assembly and in alignment with said power plant output element axis, the improvement comprising said frame means having a structural element defining a rearwardly opening recess, disengageable coupling means for drivingly coupling said input element with said output element for driving said rear axle assembly from said power plant, and means carried by said housing assembly for detachably affixing said housing assembly to said frame means structural element within said recess and with said coupling means in engagement, said recess and said frame means being configured to permit said final drive assembly including said input element to be rolled as a unit rearwardly from said recess, said output element and said frame means upon rear wheel balloon tires upon release of the means detachably affixing said housing assembly to said frame means and said coupling means.

2. In a final drive arrangement as set forth in claim 1 wherein the input and output elements comprise respective shafts and the coupling means comprises a splined coupling.

3. In a final drive arrangement as set forth in claim 1 wherein the input an output elements comprise respective shafts and the coupling means comprises a universal joint.

4. In a a final drive arrangement for a wheeled vehicle comprising frame means, a single seat carried by said frame means, at least one front wheel carrying a balloon tire dirigibly supported by said frame means, a power plant supported by said frame means and having an output element extending in a generally longitudinal direction, and a final drive assembly comprising a housing assembly, a rear axle assembly journaled in said housing assembly, a pair of rear wheels carrying balloon tires affixed to opposite sides of said rear axle assembly, and a final drive for driving said rear axle assembly comprising an input element extending in a generally longitudinal direction and positioned at one side of said final drive assembly and in alignment with said power plant output element, the improvement comprising said frame means having a structural element defining a rearwardly opening recess, coupling means for drivingly coupling said input element with said output element for driving said rear axle assembly from said power plant, and means carried by said housing assembly for detachably affixing said housing assembly to said frame means structural element within said recess and with said coupling means in engagement, said recess and said frame means being configured to permit said final drive assembly to be rolled as a unit rearwardly from said recess and said frame means upon rear wheel balloon tires upon release of the means detachable affixing said housing assembly to said frame means said frame means comprising a pair of structural elements defining rearwardly opening recesses adapted to receive a portion of the final drive assembly, said final drive assembly being at least in part detachably affixed to said structure elements.

5. In a final drive arrangement as set forth in claim 4 wherein the structural elements comprise a pair of spaced apart plates affixed to respective frame tubes at sides of the frame assembly.

6. In a final drive arrangement as set forth in claim 5 further including a structural member extending between and affixed to said plates for reinforcing said frame assembly.

7. In a final drive arrangement as set forth in claim 6 wherein the lower end of the plates are formed with outwardly extending flanges for reinforcement thereof.

8. In a final drive arrangement as set forth in claim 7 wherein the input and output elements comprise respective shafts and the coupling means comprises a splined coupling.

9. In a final drive arrangement as set forth in claim 7 wherein the input and output elements comprise respective shafts and the coupling means comprises a universal joint.

10. In a final drive arrangement as set forth in claim 9 further including an elastomeric boot encircling the universal joint.

11. In a final drive arrangement as set forth in claim 1 wherein the power plant includes a casting having a longitudinally extending portion in which a part of the output element is journaled for rotation, said final drive assembly having a casting portion in which the input element is journaled and which is aligned with the power plant casting portion and means for affixing said casting portions to each other.

12. In a final drive arrangement as set forth in claim 11 wherein the fram means comprises a pair of structural elements defining rearwardly opening recesses adapted to receive a portion of the final drive assembly, said final drive assembly being at least in part detachably affixed to said structural elements.

13. In a final drive arrangement as set forth in claim 12 wherein the structural elements comprise a pair of spaced apart plates affixed to respective frame tubes at sides of the frame assembly.

14. In a final drive arrangement as set forth in claim 13 further including a structural member extending between and affixed to said plates for reinforcing said frame assembly.

15. In a final drive arrangement as set forth in claim 14 wherein the lower end of the plates are formed with outwardly extending flanges for reinforcement thereof.

16. In a final drive arrangement as set forth in claim 1 wherein the frame means comprises at least one structural element defining a rearwardly opening recess adapted to receive a portion of the final drive assembly, said final drive assembly being at least in part detachably affixed to said structural element.

17. In a final drive arrangement for a wheeled vehicle comprising frame means, a single seat carried by said said frame means, at least one front wheel carrying a balloon tire dirigibly supported by said frame means, a power plant supported by said frame means and having an output element extending in a generally longitudinal direction, and a final drive assembly comprising a housing assembly, a rear axle assembly journaled in said housing assembly, a pair of rear wheels carrying balloon tires affixed to opposite sides of said rear axle assembly, and a final drive for driving said rear axle assembly comprising an input element extending in a generally longitudinal direction and positioned at one side of said final drive assembly and in alignment with said power plant output element, the improvement comprising said frame means having a structural element defining a rearwardly opening recess, coupling means for drivingly coupling said input element with said output element for driving said rear axle assembly from said power plant, and means carried by said housing assembly for detachably affixing said housing assembly to said frame means structural element within said recess and with said coupling means in engagement, said recess and said frame means being configured to permit said final drive assembly to be rolled as a unit rearwardly from said recess and said frame means upon rear wheel balloon tires upon release of the means detachably affixing said housing assembly to said frame means, said housing assembly defining a cavity at one end thereof and carrying bearing means at the other end thereof for rotatably journaling one side of said rear axle assembly and a cover plate enclosing said cavity and carrying bearing means for rotatably journaling the other end of said rear axle assembly, said final drive including a pair of meshing gears contained within said cavity.

18. In a final drive arrangement as set forth in claim 17 wherein the final drive means comprises a ring and pinion gear, said ring gear being affixed to an internally splined hub, said rear axle assembly including an axle having a splined engagement with said internally splined hub.

19. In a final drive arrangement as set forth in claim 18 wherein at least a portion of the means for journaling the rear axle assembly comprises bearing means rotatably journaling said hub.

20. In a final drive arrangement as set forth in claim 19 wherein the bearing means rotatably journaling the hub comprises a bearing carried by the housing assembly and interposed between the other mentioned bearing means.

21. In a final drive arrangement as set forth in claim 11 wherein the frame means comprises at least one structural element defining a rearwardly opening recess adapted to receive a portion of the final drive assembly, said final drive assembly being at least in part detachably affixed to said structural element.

22. In a final drive arrangement as set forth in claim 11 wherein the housing assembly defines a cavity at one end thereof and carries bearing means at the other end thereof for rotatably journaling one side of the rear axle assembly and a cover plate enclosing said cavity and carrying bearing means for rotatably journaling the other end of said rear axle assembly, said final drive including a pair of meshing gears contained within said cavity.

23. In a final drive arrangement as set forth in claim 22 wherein the final drive means comprises a ring and pinion gear, said ring gear being affixed to an internally splined hub, said rear axle assembly including an axle having a splined engagement with said internally splined hub.

24. In a final drive arrangement as set forth in claim 23 wherein at least a portion of the means for journaling the rear axle assembly comprises bearing means rotatably journaling said hub.

25. In a final drive arrangement as set forth in claim 24 wherein the bearing means rotatably journaling the hub comprises a bearing carried by the housing assembly and interposed between the other mentioned bearing means.

26. A final drive arrangement for a three wheeled vehicle or the like comprising a housing assembly carrying a pair of spaced bearings, an axle shaft extending through said housing assembly and operably journaled by said bearings, said axle shaft having shoulder means formed thereon for limiting the degree of movement of said axle shaft in one axial direction relative to said housing means, and detachable fastening means affixed to said axle shaft for limiting the movement of said axle shaft relative to said housing means in the other axial direction and for removal of said axle shaft from said housing assembly in the other axial direction upon removal of said detachable fastening means.

27. A final drive arrangement as set forth in claim 26 further including a final drive cavity defined by said housing assembly and enclosed by a cover, a final drive contained within said cavity for driving said axle shaft, one of said bearing means being supported by said cover.

28. A final drive arrangement as set forth in claim 26 further including a hub contained within said housing assembly and journaled for rotation by said housing assembly, said hub being formed with internal splines, the axle shaft having external splines engaged with said hub internal splines.

29. A final drive arrangement as set forth in claim 28 further including ring gear means affixed for rotation with the hub for driving the axle shaft.

30. A final drive arrangement as set forth in claim 29 wherein one of the bearing means carried by the axle housing is disposed on one side of the ring gear and further including further bearing means supported by said housing assembly and journaling said hub on the other side of said ring gear means.

31. A final drive arrangement as set forth in claim 29 further including a pinion gear rotatably journaled within said housing assembly and enmeshed with said ring gear for driving said ring gear, said pinion gear being formed on a shaft having a portion extending toward the axle shaft from said pinion gear and journaled in said housing assembly.

32. A final drive arrangement as set forth in claim 31 wherein one of the bearing means carried by the axle housing is disposed on one side of the ring gear and further including further bearing means supported by said housing assembly and journaling said hub on the other side of said ring gear means.

* * * * *